Figure 1:
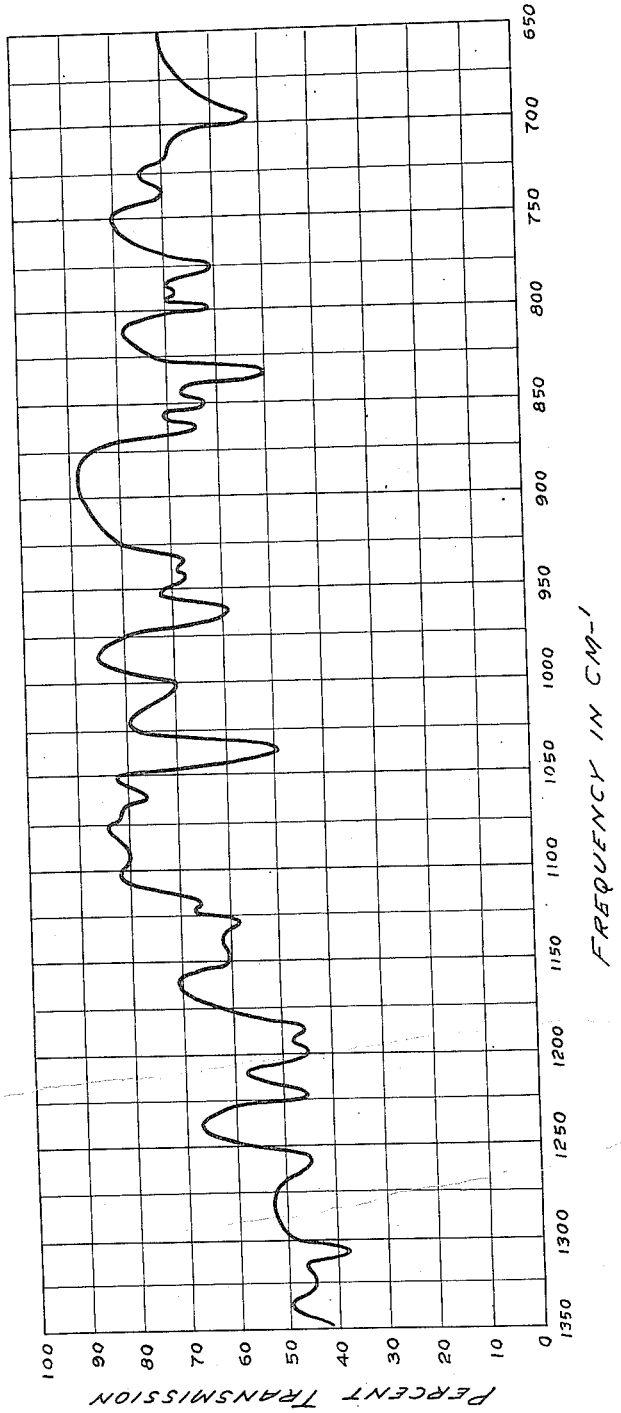
Figure 2:
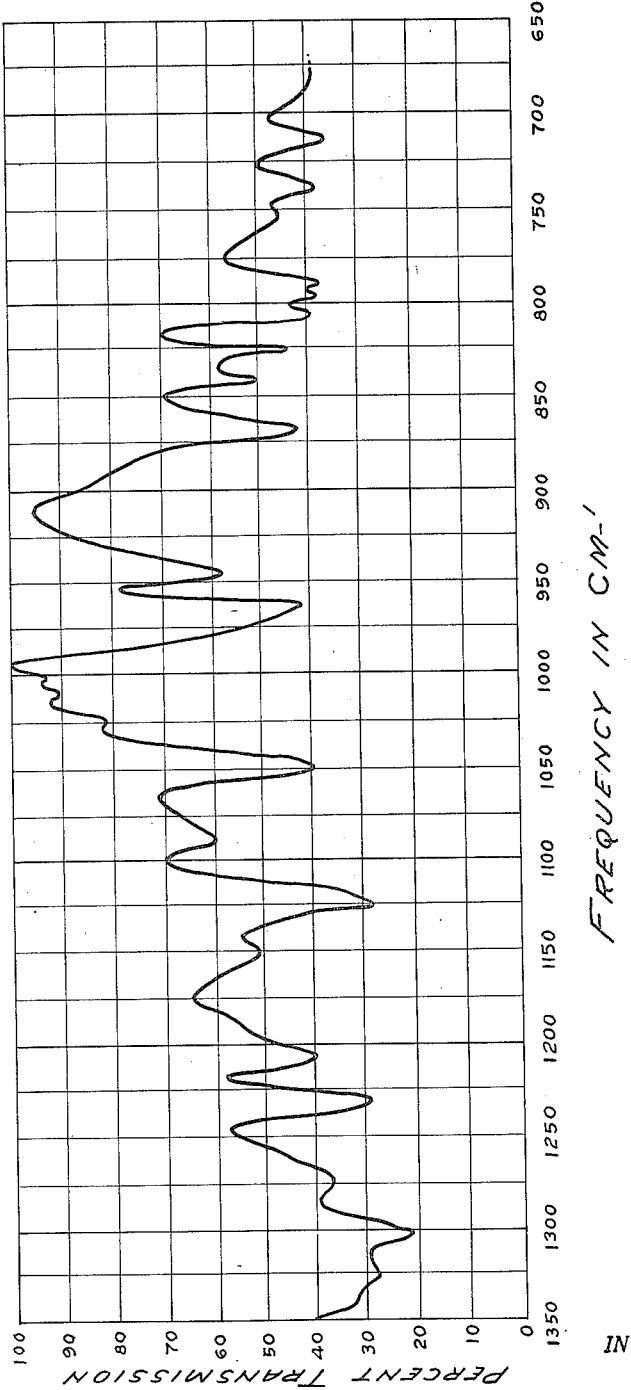

Sept. 13, 1949.  B. M. DUGGAR  2,482,055
AUREOMYCIN AND PREPARATION OF SAME
Filed Feb. 11, 1948  2 Sheets-Sheet 1

INVENTOR.
BENJAMIN M. DUGGAR,
BY Harvey W. Selblete
ATTORNEY.

Sept. 13, 1949.  B. M. DUGGAR  2,482,055
AUREOMYCIN AND PREPARATION OF SAME
Filed Feb. 11, 1948  2 Sheets-Sheet 2

INVENTOR.
BENJAMIN M. DUGGAR,
BY Harvey W. Edelblute ATTORNEY.

Patented Sept. 13, 1949

2,482,055

UNITED STATES PATENT OFFICE 2,482,055

AUREOMYCIN AND PREPARATION OF SAME

Benjamin M. Duggar, Pearl River, N. Y., assignor to American Cyanamid Company, New York, N. Y., a corporation of Maine Application February 11, 1948, Serial No. 7,592

8 Claims. (Cl. 167—65)

This invention relates to aureomycin and preparation of same.

During the past few years a number of metabolic products of the growth of bacteria and fungi have been isolated and found to possess valuable therapeutic properties. Among these may be mentioned penicillin, streptomycin, gramicidin, tyrocidine, bacitracin, subtilin, actinomycin, clavacin, streptothricin and many others. Some of these have proven to be extremely valuable because of their effectiveness against pathogenic organisms. Others have been found to be of limited usefulness because of their toxicity or the narrow range of their antibacterial activity.

Certain of the previously described antibiotics are mainly effective against Gram positive organisms and have little or no activity against many pathogens of the Gram negative class. Penicillin is a prominent member of this class. Very few of the antibiotics described thus far are effective against Gram negative organisms, and these substances generally possess undesirable properties such as being toxic to some patients, ineffective when administered orally, and tending to lose their effectiveness through development of resistant strains of the organism to the drug.

Inasmuch as many important diseases are caused by pathological bacteria of the Gram negative group, it is highly desirable that antibiotics be discovered which are effective against this latter class of bacteria. It is, therefore, one of the objects of the present invention to describe a new antibiotic substance which is highly effective against Gram negative bacteria. Not only is the new antibiotic of the present invention active against Gram negative organisms of a large number and wide variety, it is also active against many of the common pathogenic Gram positive bacteria. Accordingly, a further object of the invention is to provide a substance possessing bacteriostatic or bactericidal activity against pathogenic organisms of both the Gram positive and Gram negative groups.

A still further object of the present invention is to provide an easy method of preparing the above mentioned antibiotic substance from fungi found in the soil. The new process gives good yields of the highly active substance and presents a way by which large quantities of the new antibiotic may be prepared for medical use.

As noted above, the new antibiotic substance has been found in in vitro studies to be effective against a large number of different types and kinds of bacteria. Among the Gram negative organisms which fail to propagate in the presence of the new antibiotic substance of the present invention may be mentioned *Escherichia coli, Eberthella typhosa, Salmonella pullorum, Shigella gallinarum, Proteus vulgaris, Klebsiella pneumoniae, Aerobacter aerogenes, Neisseria catarrhalis,* and *Brucella abortus.* Among the Gram positive organisms whose growth is inhibited in vitro by the new antibiotic are *Bacillus cereus, Mycobacterium tuberculosis, Staphylococcus aureus, Bacillus subtilis,* and *Streptococcus pyogenes.* Other pathogens are also affected by the new substance of the present invention in varying degrees.

The new substance forms salts with acids and is soluble in dilute acids but tends to precipitate from solution near neutrality. The antibiotic decomposes when heated in aqueous solutions of strong acids or alkalis. It contains the elements carbon, hydrogen, nitrogen, chlorine, and oxygen. Chemical analysis of a number of samples of the purified mono-hydrochloride salt averaged carbon 51.49%, hydrogen 5.44%, nitrogen 5.53%, chlorine 13.51%, ash none, oxygen 24.03% by difference. Other acid salts of the free base are readily formed on simple neutralization with acids such as sulphuric, phosphoric, acetic and the like. Such acid salts are a preferred form of the new product because of their convenience in preparation and handling. Precipitates with picric acid, Reinecke's acid, and ammonium molybdate are also formed in aqueous solutions.

Crystals of the hydrochloride salt occur in tabular or equidimensional orthorhombic form, sometimes showing a rhomboid outline. There is no marked cleavage, and on breaking the crystals show a conchoidal fracture. Their color is a clear, vitreous lemon yellow. Examination under the polarizing microscope showed the crystals to be biaxial with an optical angle of >60°, optical sign negative. The refractive indices were, $\alpha=1.633\pm.005$, $\beta=1.705\pm.005$, $\gamma=1.730\pm.005$. All extinctions were either parallel or symmetrical. Crystals of the free base are very small acicular to bladed in habit, and have a refractive index parallel to elongation of slightly greater than 1.674 but not more than about 0.020. The specific rotation of the free base in methanol was $$[\alpha]_{23}^{D} = -274.9$$

The specific rotation of the hydrochloride salt in methanol was $$[\alpha]_{23}^{D} = -295.9$$

and in water $$[\alpha]_{23}^{D} = -227.9$$

The free base is very soluble in pyridine and is soluble in methanol and acetone at 25° C., to the extent of about 13 to 14 milligrams per ml. It is considerably less soluble in ethanol, and in water it has a solubility at 25° C. of about 0.55 milligram per ml. On the other hand, the hydrochloride salt is soluble in water and methanol, slightly soluble in ethanol and is soluble in acetone at 25° C., to the extent of about 0.13 milligram per ml.

The new antibiotic substance of the present invention displays characteristic absorption bands in both the ultra violet and infra red ranges of the spectrum. In the ultra violet region when the hydrochloride salt was dissolved in an aqueous solution at pH 2, containing 0.1 mol of phosphoric acid, the absorption curve showed maximum absorption at about 365 m$\mu$, 264 m$\mu$, and 226 m$\mu$. Minimum absorption occurred at 305 m$\mu$, 242 m$\mu$, and 215 m$\mu$. At pH 4.3, using 0.1 molar $KH_2PO_4$ as buffer, maximum absorption occurred at 370 m$\mu$, 265 m$\mu$, 251 m$\mu$, and 229 m$\mu$. At pH 8.9 in an aqueous solution of 0.1 molar $K_2HPO_4$ as buffer, maximum absorption occurred at 276 m$\mu$, 248 m$\mu$, 240 m$\mu$, and 223 m$\mu$. Minimum absorption was at 325 m$\mu$, 262 m$\mu$, 245 m$\mu$, and 233 m$\mu$. In general, these maximal and minimal absorption bands are not sharply defined, and different observers may select the exact point of inflection at slightly different wave lengths.

Characteristic infra red absorption spectra taken on a sample of the hydrochloride salt mulled in hydrocarbon oil show the following features: an O—H or N—H absorption band near 3295 cm.$^{-1}$ phenyl C—H absorption at 3050 cm.$^{-1}$, a possible amide carbonyl at 1665 cm.$^{-1}$, a possible C=C stretching frequency at 1615 cm.$^{-1}$, a possible N—H bending vibration at 1575 cm.$^{-1}$, a para substituted phenyl absorption near 1523 cm.$^{-1}$, a possible R—CH=CH—R, CH bending vibration at 969 cm.$^{-1}$, and perhaps a para phenyl band at 840 cm.$^{-1}$ with sufficient additional substitutions (3 symmetrical) as shown by absorption at 851 and 863 cm.$^{-1}$.

The infra red absorption spectra of the hydrochloride salt in mineral oil shows many other unassignable absorption bands, particularly in the region from 650 to 1350 cm.$^{-1}$, sometimes called the "fingerprint" region of the infra red spectrum. The absorption curve in this region is shown in Figure I of the accompanying drawing. These absorption bands show that the antibiotic substance of the present invention is different from any previously described antibiotic material.

Similarly to the above, the free base shows a strong O—H or N—H absorption band near 3420 cm.$^{-1}$, most probably an O—H absorption, and other O—H or N—H absorption bands between the range 3200 to 3300 cm.$^{-1}$. The absorption curve also shows a phenyl C—H absorption band at 3050 cm.$^{-1}$, a possible amide carbonyl at 1643 cm.$^{-1}$, a possible C=C stretching frequency at 1609 cm.$^{-1}$, a possible N—H bending vibration at 1580 cm.$^{-1}$, a p-substituted phenyl absorption near 1523 cm.$^{-1}$, a possible R—CH=CH—R, CH bending vibration at 969 cm.$^{-1}$, and a p-phenyl band at 825 cm.$^{-1}$, with additional substitutions at 844 cm.$^{-1}$ and 867 cm.$^{-1}$, as shown in the curve of Figure II. Additional characteristic absorption bands are also shown in the range 650 cm.$^{-1}$ to 1350 cm.$^{-1}$ in Figure II.

The organism which produces the new antibiotic substance of the present invention was isolated from the soil of a timothy field in Missouri. Cultures of the living organism have been deposited with the Fermentation Division of the Northern Regional Research Laboratory at Peoria, Illinois, and have been added to their permanent collection of microorganisms as NRRL-2209. Structurally and functionally this organism as found naturally in the soil and as represented by spontaneous or induced mutants, belongs to the genus currently distinguished as Streptomyces. It is typically aerobic, with limited growth when submerged. A mycelium is formed, and when young, discrete colonies in asparagine-meat extract-agar (hereafter referred to as AMD agar) display branched hyphae, rapidly intermeshed, producing a dense, button-like colony with the free ends of the hyphae generally flexuous and continuous. Surface colonies are raised, often slightly depressed at the center. Agar slants sown with well distributed, numerous spores yield a confluent growth, that is, a continuous and "prostrate" mycelial stratum in the exposed or outer layer of the nutrient matrix, a growth type commonly called surface growth. Colonies in this state of growth on AMD agar are commonly hyaline for at least 48 hours, gradually changing to orange yellow (dull to bright), and in the several forms that may be selected out, pigmentation of the hyphal mass may be described as a hygrophanous Persian yellow, apricot yellow, maize yellow (Oberthür et Dauthenay, Repertoire de couleurs), yellow buff, or turbid variations of the clearer qualities.

The AMD agar is only slightly, if at all, pigmented with the growth of A-377 recently isolated from soil. On the AMD agar a continuous growing surface on a slant culture exhibits aerial hyphae with conidia white at first, becoming dark gray and abundant as sporing proceeds (7–10 days). The reverse view at this stage is tawny. Fragmented hyphal remains are also gray.

Young hyphae are Gram-negative (older hyphae variable) and not acid fast; these younger hyphae measuring about 0.7–0.8$\mu$ in diameter and up to twice as much when differentiating conidia. The conidia are spheroidal to ovoidal, measuring up to 1.5$\mu$ in the longer diameter.

Growth on AMD agar is very good and conidial production abundant, with favorable temperature.

Growth on nutrient broth agar is good but production of aerial hyphae and conidia is inhibited. With added $NaNO_3$ there is no improvement, and only a slight betterment with the addition of dextrose.

Growth on corn steep liquor agar is very good, conidial formation slow but ultimately (15 days) heavy.

Growth on synthetic (Uschinsky's asparagin) agar yields a heavy hydrophanous yellow-tan prostrate mycelium, no conidia, and the medium displays a cloudy amber pigmentation.

Growth on steamed potato slants is orange yellow (to brownish yellow in certain mutants), considerably raised, surface eventually nodulate.

Gelatin stabs display no liquefaction in 15 days at about 26° C.

Nutrient broth affords a collar of almost hyaline growth at the glass surface; with added nitrate growth is similar, but with either dextrose or starch added the collar is yellowish-brown.

Litmus milk also supports a slight growth collar, yellow brown above, but in 15 days there is neither significant pH change nor apparent peptonization.

In fermentation tubes (with phenol red as indicator, pH 6.8–7) there is no gas accumulation with the addition to the nutrient broth of either xylose, glucose, galactose, sucrose, maltose, lactose, glycerol, or mannitol. Acidity is indicated over a period of about 5 days with only glucose or sucrose, this color change being gradually succeeded by a slow change toward alkalinity. In the presence of the other carbon sources either no change occurred (maltose, glycerol) or increasing alkalinity developed, this being strongest with mannitol.

Among other carbon-furnishing substances, dextrose, sucrose, maltose, lactose, dextrin, starch, glycerol, and mannitol support growth.

Dispersed in agar, soluble starch is hydrolyzed in a zone around the colony (pH=5.8 to 6.0). Hydrolysis of starch is also induced when the dispersion is in nutrient broth.

Optimum growth and spore formation for a representative form of Streptomyces aureofaciens occur in the temperature range 28°-37° C. Growth is slow at 17° C. The upper limit of growth is around 42° C. The thermal tolerance, or LD50, is approximately 55° C., with standard time period (10 minutes), using as immersion containers special thin-walled (drawn out) glass tubes. Complete killing is obtained at approximately 65° C.

The characteristics above are believed to differentiate the organism and its forms from any described American species. Accordingly, the name Streptomyces aureofaciens has been proposed to designate the new organism described hereinabove. NOTE.—"Aureomycin, a new antibiotic," Annals of the New York Academy of Sciences, vol. 51, art. 2, pages 175–342, November 30, 1948.

To produce the new antibiotic substance a culture of the just described mold is grown aerobically, preferably in deep tank culture, in a suitable nutrient medium under conditions of time, temperature, pH, etc. as will be hereinafter described. The nutrient medium contains, in common with media in which other fungi are grown for the production of antibiotic substances, a source of carbon such as a soluble carbohydrate; a source of nitrogen, organic or inorganic; certain mineral salts such as phosphates, and traces of various metals which are usually found as impurities in the other substituents of the medium.

As a carbon source, there may be used ordinary starch, the so-called soluble starches, and sugars such as sucrose, glucose, maltose, dextrose, or the like and other water soluble or partially water soluble carbohydrate substances such as sugar alcohols, etc. The amount of such carbon sources for best antibiotic production in the medium may vary considerably, from about ½% to 5% by weight of the total weight of the fermentation medium.

Suitable sources of nitrogen for the fermentation process include a wide variety of substances such as the amino acids, casein, both hydrolyzed and unhydrolyzed, fish meal, soy bean meal, meat extracts, liver cake, and various other nitrogenous substances of vegetable or animal origin. Chemicals such as urea, nitrates, and ammonium compounds may also be added to the nutrient media as a source of nitrogen. Chemical precursors may be added as a source of particular preformed groups of the molecule whereby higher yields of the product are obtained. Corn steep liquor, because of the wide variety of substances contained therein, both organic and inorganic, has been found to be a valuable addition to the fermentation media. It is not possible, of course, because of the crude nature of many of these nitrogenous substances to specify definite proportions of the material to be added. An amount of about 0.1% to 5.0% by weight on a solids basis would cover the useful range of nitrogenous substances to be added to the media in most cases.

In common with most fermentation processes, the process of the present invention is conducted with a liquid medium containing certain inorganic salts such as phosphates. Among elements which may be desirable in small amounts are potassium, calcium, magnesium, sulfur, iron, and certain elements in traces. When using crude substances as a source of nitrogen or carbon, however, such as corn steep liquor, many of these elements are contained therein and need not be added to the medium.

The pH of the fermentation medium should preferably be on the acid side, around pH 6 to pH 7 at the start of the fermentation. This may be obtained by adjustment of the medium, if necessary, with suitable buffering agents such as phosphate salts. As the fermentation progresses, the pH of the medium tends to decline to as low as about 4.0. Best results appear to be obtained when the pH of the medium drops to below 5.6, as for some reason the higher pH values at the end of the fermentation have commonly paralleled low yields of the antibiotic substance.

The preferred temperature of the fermentation process is about 26° to 28° C., although temperatures as low as about 20° C. or as high as 35° C. may be used. Maximum yield could be obtained within 30 to 40 hours of fermentation at optimum conditions of temperature and air pressure, but, of course, lower yields could be obtained in a shorter period of time, and a longer period might even be desirable under some conditions.

To isolate the above described fungus for use in the process herein, a sample of soil is suspended in water and heated at 54° C. for ten minutes to eliminate many of the spreading types of black molds and certain heat sensitive bacteria. A parallel test is arranged with an unheated sample. A nutrient agar composed of 2 grams of meat extract, 0.5 gram of asparagin, 10 grams of dextrose, ½ gram of $K_2HPO_4$, and 18 grams of agar per liter of water is prepared and plates poured as usual. The soil suspension is diluted and spread on the agar plates, and the latter are then incubated at 26° to 28° C. Certain areas of the dilution plates may be cautiously flooded with a desirable assay organism such as Escherichia coli to aid in isolating a culture.

When an organism having the characteristics set out hereinabove has been isolated from the soil sample in single colonies, it may be then transferred to other growth media and subsequently used to inoculate large scale volumes of fermentation media for commercial production of the antibiotic.

Small scale fermentation, for laboratory investigation or for the production of inocula for larger fermentations, may be conducted in shaker flasks open to the air but protected from contamination with cotton plugs. As a typical case, 100 milliliters of a culture medium composed of 1 to 2% corn steep liquor, 1 to 3% sucrose, 0.5% $(NH_4)_2HPO_4$, 1.5% of $KH_2PO_4$, 0.2% $MgSO_4.7H_2O$ (and to make sure that adequate trace elements are present), 0.00033% $MnCl_2.4H_2O$, 0.00033% $CuSO_4.5H_2O$, and 0.005% $ZnSO_4.7H_2O$ are introduced into 500 milliliter Erlenmeyer flasks and sterilized.

After autoclaving, the medium, having a pH of 6.2, is inoculated with a small quantity, about 1% by volume, of a turbid aqueous spore suspension from an agar slant. The contents of the flask are then incubated at 28° C. for 24 to 36 hours, while shaking at 110 strokes per minute. After the incubation period the liquor contains about 1,000 to 1,500 arbitrary A-377 units/ml. (extreme limits usually 500 to 2,000 units in the several available strains). Such arbitrary units are measured under the conditions defined for the three hour turbidimetric assay of penicillin with *Staphylococcus aureus*. Usually one *Streptomyces aureofaciens* unit will completely inhibit growth of *Staphylococcus aureus* in ten milliliters of the nutrient broth. Slightly lower yields of the antibiotic substance might be produced in a similar medium in which the trace elements Mn, Cu, and Zn are omitted.

For larger scale production of aureomycin a fermentation medium containing 1% (by weight) corn steep liquor, 1% (by weight) sucrose, 0.2% $(NH_4)_2HPO_4$, 0.2% $KH_2PO_4$, 0.025% $MgSO_4.7H_2O$, and 0.1% $CaCO_3$ is made up to a volume of 200 liters and introduced into a 100 gallon glass lined tank. The medium is sterilized with steam for 15 to 20 minutes at 118° to 120° C. The natural unadjusted pH of the medium is 6.2 to 6.4 before sterilization and 6.0 to 6.1 after sterilization. During a normal fermentation the pH drops to about 4.5 to 4.8.

The above tank medium may be inoculated with spores from agar slant cultures or with culture material which is primarily vegetative mycelium, commonly known to those skilled in the art as "preformed inoculum." The latter type of inoculum may be added in an amount equal to about 0.1 to 2% by volume of the liquid in the tank. More inoculum may be used if desired. It will be understood, of course, that the inoculations are made aseptically. The fermentation is conducted with agitation and/or aeration. Various types of agitators have been used with good results. The rate of aeration may vary considerably and will depend in part upon the kind of agitator used and the rate at which it is operated. A rate of air flow from about 0.2 to 3.0 liters of air per liter of mash per minute can be used, the preferred rate of aeration being from about 0.5 to 1.5 liters of air per liter of mash per minute. Excessive foaming of the fermentation medium may be controlled by the addition of anti-foaming agents such as a higher alcohol or a hydrocarbon oil or mixtures thereof, a preferred mixture being a 1% solution of octadecanol in lard oil. The sterile anti-foam agent may be added aseptically in small amounts as needed.

Fermentation is conducted preferably at 26° to 28° C. with a positive pressure in the tank to reduce the danger of contamination. After 24 to 48 hours the fermentation liquor may be withdrawn, filtered, and treated to recover the new antibiotic substance.

Various processes relying upon physical and chemical properties of aureomycin may be devised for recovering it from the fermentation liquor. One such recovery method, which is, however, not a part of the present invention, being the invention of Charles Pidacks and Edward Starbird, Serial Number 62,765, filed November 30, 1948, is as follows:

The fermented mash of *Streptomyces aureofaciens* is filtered, and the clear filtrate is adsorbed completely by Florisil in a glass column. The adsorption filtrate is discarded. Adsorption of the active material from the crude filtrate can also be accomplished by charcoals, such as Darco-G-60, Nuchar, etc., and by Super Filtrol, aluminum oxide, MgO, etc. The column is then washed with water to remove the residual mash and other impurities. This wash is discarded. An acetone wash follows, and this removes considerable colored impurities. The acetone wash is discarded.

The column is then developed chromatographically with acid alcohol into three distinct bands, when observed by ultra violet light. The chromatographic column can be developed by alcohols, methyl, ethyl, propyl, etc. and by acetone, if the pH of these solvents is held below 5.0 with acids such as HCl, $H_2SO_4$, etc. The first band to be removed from the column is blue in ultra violet light and contains little or no activity and is discarded. The second band is very brilliant yellow in ultra violet light and contains the bulk of the activity. The third band is a dull brown in ultra violet light and contains a small amount of activity. The eluate containing the material in the bright yellow band is concentrated to dryness in vacuo, and the dry product extracted with n-butyl alcohol. The n-butyl alcohol extract contains all the activity. The butyl alcohol extract is water washed, and the butanol phase, containing the activity, is concentrated, in vacuo, to a very small volume. The activity is precipitated out of this butanol by absolute ether. The precipitate is washed with ether and dried.

This dry product is then suspended in water, acidified with HCl to a pH of 2.0 to 3.0 to increase the concentration of the antibiotic in water, and this solution is then frozen and dried. This dry product has a biological potency of 2900 units/mg. based on the Penicillin G Oxford unit.

The active material can be salted into the following solvents using $(NH_4)_2SO_4$; esters such as methyl acetate, ethyl acetate, amyl acetate, etc.; alcohols such as isopropyl, butyl, etc., and in acetone. The active material is extracted by the above immiscible solvents without the use of $(NH_4)_2SO_4$, however, the yield is much lower.

I claim:

1. Substances effective in inhibiting the growth of Gram positive and Gram negative bacteria selected from the group consisting of a substance capable of forming salts with acids, containing the elements carbon, hydrogen, nitrogen, chlorine, and oxygen, being very soluble in pyridine, soluble in methanol and in acetone and being slightly soluble in ethanol and in water, its crystals having a refractive index parallel to elongation between about 1.674 and 1.694, and exhibiting characteristic absorption bands in the infra red region of the spectrum when suspended in a hydrocarbon oil in solid form at the following frequencies expressed in reciprocal centimeters: 3420, 1643, 1609, 1580, 1523 1302, 1231, 1209, 1121, 1080, 1050, 969, 943, 867, 844, 825, 805, 794, 788, 733, 713 and the acid salts of said substance.

2. A substance effective in inhibiting the growth of Gram positive and Gram negative bacteria which is capable of forming salts with acids, containing the elements carbon, hydrogen, nitrogen, chlorine, and oxygen, being very soluble in pyridine, soluble in methanol and in acetone and being slightly soluble in ethanol and in water, its crystals having a refractive index parallel to elongation between about 1.674 and 1.694, and exhibiting characteristic absorption bands in the infra red region of the spectrum when suspended in a hydrocarbon oil in solid form at the following frequencies expressed in reciprocal centimeters: 3420, 1643, 1609, 1580, 1523, 1302, 1231, 1209, 1121, 1080, 1050, 969, 943, 867, 844, 825, 805, 794, 788, 733, and 713.

3. The monohydrochloride salt of an organic substance said salt being effective against Gram positive and Gram negative bacteria, being soluble in water and in methanol and very slightly soluble in acetone, containing the elements carbon, hydrogen, nitrogen, chlorine, and oxygen, the crystals of which have refractive indices of $\alpha = 1.633 \pm 0.005$; $\beta = 1.705 \pm 0.005$; and $\gamma = 1.730 \pm 0.005$, and exhibiting characteristic absorption bands in the infra red region of the spectrum when measured in the solid state while suspended in hydrocarbon oil at the following frequencies expressed in reciprocal centimeters: 3295, 3050, 1665, 1615, 1575, 1523, 1310, 1263, 1225, 1044, 1009, 969, 863, 851, 840, 800, 770, and 698.

4. A process for the production of aureomycin which comprises growing under aerobic conditions a culture of *Streptomyces aureofaciens* in an aqueous medium having a pH between 4 and 7 and containing a soluble carbohydrate, a source of assimilable nitrogen and essential mineral salts at temperatures within the range 20° C. to 35° C. for a period of time of about twenty-four to forty-eight hours whereby the aqueous medium is fermented and aureomycin is produced.

5. A method of producing aureomycin which comprises the step of introducing a culture of *Streptomyces aureofaciens* into an aqueous nutrient liquor having a pH between about 6 and 7 and containing fermentable carbonaceous and nitrogenous substances and mineral salts and fermenting said liquor aerobically until the pH of the liquor has dropped to below about 5.

6. A process of producing aureomycin, which comprises the steps of introducing spores of the fungus *Streptomyces aureofaciens* in an aqueous liquor containing as nutrient material a usable carbonaceous substance, a source of assimilable nitrogen, and mineral substances essential for the growth of the fungus and after said liquor has been fermented by the said fungus at a temperature within the range 20° to 35° C. at a pH between about 4 and 7 separating the insoluble mycelia from the aqueous solution.

7. A process which comprises the steps of aerobically fermenting an aqueous nutrient liquor at a temperature within the range 20° to 35° C. at a pH between about 4 and 7 with the fungus *Streptomyces aureofaciens*, whereby aureomycin is produced.

8. A method which comprises the steps of growing the fungus *Streptomyces aureofaciens* in an aqueous solution containing 0.1% to 5.0% by weight of a nitrogenous substance, 0.5% to 5.0% by weight of a usable carbonaceous material, and having a pH between about 4 and 7 and a temperature of between 20° C. and 35° C., while aerating the liquor, whereby aureomycin is produced.

BENJAMIN M. DUGGAR.

REFERENCES CITED

The following references are of record in the file of this patent:

Waksman et al.: J. Biol. Chem., vol. 142, pp. 520–525 (1942).

Schatz et al.: Proc. Natl. Acad. Sci., May 15, 1945, pp. 130, 131.

Waksman: Jour. Am. Pharm. Ass'n., Nov. 1945, p. 275.

Le Page et al.: Jour. Biol. Chem., Jan. 1946, pp. 163, 164.

Fried et al.: J. Biol. Chem., vol. 168, pp. 391–392 (April 1947).

Ehrlich et al.: Science, vol. 106, p. 417 (Oct. 31, 1947).

Gottlieb et al.: J. Bact., vol. 55, pp. 409–417 (1948; received for publication Dec. 23, 1947).